(12) United States Patent
Savenok et al.

(10) Patent No.: US 11,133,948 B2
(45) Date of Patent: Sep. 28, 2021

(54) STATELESS QUEUE SYSTEM FOR SYNCHRONIZED CLIENT CONSUMPTION OF QUEUED CONTENT

(71) Applicant: Vertigo Media, Inc., Charlotte, NC (US)

(72) Inventors: Alexander Savenok, Grandview, MO (US); Pavel Savenok, Wheaton, IL (US); Gregory H. Leekley, Charlotte, NC (US); Sai H. Chow, Overland Park, KS (US)

(73) Assignee: Vertigo Media, Inc., Charlotte, NC (US)

( * ) Notice: Subject to any disclaimer, the term of this patent is extended or adjusted under 35 U.S.C. 154(b) by 0 days.

(21) Appl. No.: 16/790,010

(22) Filed: Feb. 13, 2020

(65) Prior Publication Data
US 2020/0186374 A1    Jun. 11, 2020

Related U.S. Application Data

(62) Division of application No. 15/670,847, filed on Aug. 7, 2017, now Pat. No. 10,567,184.

(51) Int. Cl.

| | | |
|---|---|---|
| *H04L 12/18* | (2006.01) | |
| *H04N 21/2743* | (2011.01) | |
| *H04L 12/58* | (2006.01) | |
| *H04L 29/06* | (2006.01) | |
| *H04N 21/4223* | (2011.01) | |
| *H04L 29/08* | (2006.01) | |
| *H04N 21/2187* | (2011.01) | |
| *H04W 4/08* | (2009.01) | |
| *G06Q 50/00* | (2012.01) | |
| *G06Q 10/10* | (2012.01) | |
| *H04N 21/231* | (2011.01) | |
| *H04N 21/233* | (2011.01) | |
| *H04W 4/21* | (2018.01) | |
| *G06Q 10/06* | (2012.01) | |
| *H04W 4/06* | (2009.01) | |
| *G06F 16/438* | (2019.01) | |
| *H04N 21/61* | (2011.01) | |

(52) U.S. Cl.
CPC ...... *H04L 12/1822* (2013.01); *G06F 16/4387* (2019.01); *G06Q 10/06311* (2013.01); *G06Q 10/107* (2013.01); *G06Q 50/01* (2013.01); *H04L 51/10* (2013.01); *H04L 51/32* (2013.01); *H04L 65/403* (2013.01); *H04L 65/4076* (2013.01); *H04L 65/607* (2013.01); *H04L 65/608* (2013.01); *H04L 67/02* (2013.01); *H04L 67/26* (2013.01); *H04L 67/42* (2013.01); *H04N 21/2187* (2013.01); *H04N 21/231* (2013.01); *H04N 21/2335* (2013.01); *H04N 21/2743* (2013.01); *H04N 21/4223* (2013.01); *H04W 4/06* (2013.01); *H04W 4/08* (2013.01); *H04W 4/21* (2018.02); *H04L 51/04* (2013.01); *H04N 21/6125* (2013.01); *H04N 21/6175* (2013.01)

(58) Field of Classification Search
None
See application file for complete search history.

(56) References Cited

U.S. PATENT DOCUMENTS

| | | | |
|---|---|---|---|
| 7,324,442 B1 * | 1/2008 | Pan | H04L 12/66 370/230 |
| 8,667,075 B1 | 3/2014 | King et al. | |
| 9,104,663 B1 | 8/2015 | Narayanan et al. | |
| 2012/0304233 A1 | 11/2012 | Roberts et al. | |
| 2014/0156828 A1 | 6/2014 | Pasternak | |
| 2014/0164563 A1 | 6/2014 | Leekley et al. | |
| 2014/0244721 A1 | 8/2014 | Taine et al. | |
| 2014/0372545 A1 | 12/2014 | Lee et al. | |
| 2015/0149628 A1 | 5/2015 | Ravi et al. | |
| 2015/0220498 A1 * | 8/2015 | Munoz | G06F 16/639 715/205 |
| 2015/0229638 A1 | 8/2015 | Loo | |
| 2015/0372999 A1 | 12/2015 | Pi-Sunyer | |
| 2016/0092425 A1 | 3/2016 | Shah et al. | |
| 2016/0173557 A1 | 6/2016 | Lee et al. | |
| 2016/0219123 A1 | 7/2016 | Slavicek et al. | |
| 2016/0337479 A1 | 11/2016 | Schnase et al. | |
| 2017/0011179 A1 | 1/2017 | Arshad et al. | |

\* cited by examiner

*Primary Examiner* — Brian Whipple
(74) *Attorney, Agent, or Firm* — Christopher J. Scott

(57) ABSTRACT

A stateless queue system implements and supports a virtual room containing a content playback queue. The system allows multiple clients to listen to queued content in a synchronized manner and to modify the same queue without requiring a broadcasting client to send playback events. The system includes a multiplicity of computing clients that can add content items to the queue by interacting with an application service. The clients are enabled to add content to the queue in a number of ways, including by simple add-on to the bottom of the queue, by vote, or by direct modification of the queue structure. Upon client entrance into the playback session, data is provided to the client that represent the queue order at the time of request, the number of votes each items contains if structure is determined by vote, the start time for each queued item, and the current playing item.

20 Claims, 2 Drawing Sheets

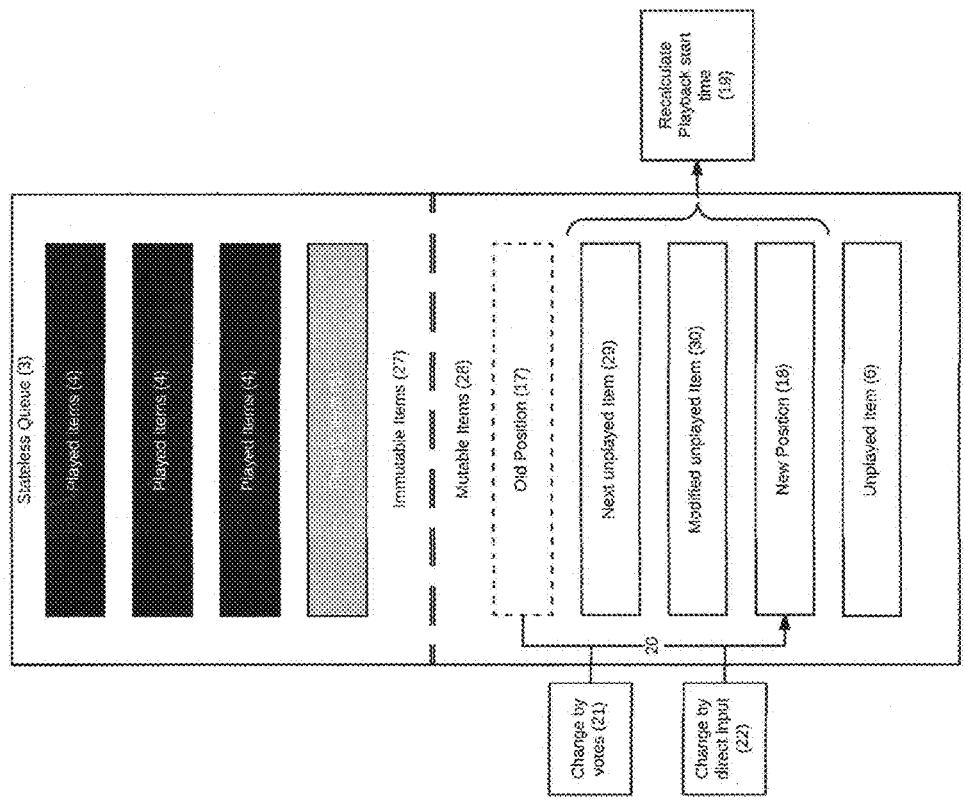
Figure 5
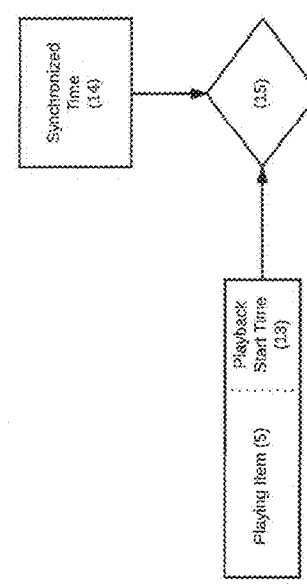
Figure 2
Figure 3
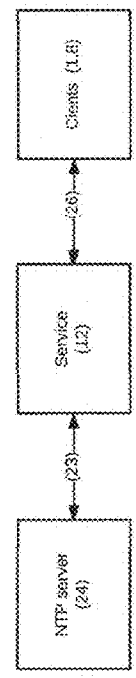
Figure 4

STATELESS QUEUE SYSTEM FOR SYNCHRONIZED CLIENT CONSUMPTION OF QUEUED CONTENT

CROSS-REFERENCE TO RELATED APPLICATIONS

This patent application is a divisional patent application of pending U.S. patent application Ser. No. 15/670,847 filed in the United States Patent and Trademark Office (USPTO) on 7 Aug. 2017, the contents of which are incorporated herein by reference in their entirety.

BACKGROUND OF THE INVENTION

Field of the Invention

The present invention relates to computer-based systems and methods for providing group stream broadcasting within a social media or digital fan club platform. The present invention expands upon state of the art social networking methods and is particularly directed to socializing a synthetic re-broadcast and group stream environment in which participants have multiple content or data origins with an ability to prioritize and queue content for playback.

Brief Description of Prior Art

Social media and digital fan club platforms utilize mobile and web-based technologies to create highly interactive environments through which individuals and communities share, co-create, discuss, and modify user-generated content. However, some social media and digital fan club platforms limit the way by which a user can share content. For example, certain social media environments and digital fan clubs do not incorporate email, instant messaging (IM), phone calls, or live video feeds into their supported technologies.

The prior art thus perceives a need for enhanced means for sharing content within a social environment including group stream broadcasting whereby a broadcasting client initiates a content sharing event and the content as broadcast to community connected clients share in content consumption as selectively sourced to each content based on user-preferred sourcing. Further, the prior art perceives a need for prioritized queueing of content being added to the group stream or broadcast experience. The present invention attempts to address these shortcomings in the prior art as summarized in more detail hereinafter.

SUMMARY OF THE INVENTION

The stateless queue system according to the present invention is designed to implement and support a virtual room containing a content playback queue as exemplified by a music queue. The stateless queue system allows multiple clients to listen to queued content in a synchronized manner and to modify the same music queue without requiring a broadcasting client to send playback events. The stateless queue system comprises a multiplicity of computing clients that can add content items to the queue by interacting with an application service that further operates to store all queue structure and data in a database.

The clients are enabled via the application service to update or add content to the queue in a number of ways, including by simple add-on to the end or back of the queue, by vote, or by direct modification to the structure of the queue. The clients may also rely on the application service to provide the current order of the queue, as for example, when entering into a playback session. Upon a client entrance into the playback session or joining the virtual room or alternatively based on time-based re-presentation, data provided to the clients represents the queue order at the time of request, the number of votes each items contains if structure is determined by vote, the start time for each queued item, and the current playing item.

The stateless queue system according to the present invention operates within the context of the systems and methods for implementing subscription-based social media or digital fan club platforms made the subject of U.S. patent application Ser. No. 15/048,480, now issued as U.S. Pat. No. 9,729,497 and the systems and methods for group streaming and rebroadcasting made the subject of U.S. patent application Ser. No. 15/305,977, now issued as U.S. Pat. No. 10,116,616, the specifications, claims, and drawings of which were incorporated in their entirety in U.S. patent application Ser. No. 15/670,847, parent to this divisional patent application. More particularly, it is contemplated that the present invention may well cooperate with the chat and live video aspects or provisions of U.S. Pat. No. 9,729,497, and the live video aspects or provisions of U.S. Pat. No. 10,116,616.

BRIEF DESCRIPTION OF THE DRAWINGS

FIG. 2 is a flowchart diagram of a resynchronization protocol or mechanism according to the present invention for providing a playback position based on playback start time and synchronized time.

FIG. 3 is a flowchart diagram of a server-direct synchronization protocol or mechanism according to the present invention whereby the stateless queue service and one or more clients directly link to the time-synchronizing server for playback synchronization.

FIG. 4 is a flowchart diagram of a server-indirect synchronization protocol or mechanism according to the present invention whereby one or more clients link to the time-synchronizing server via the stateless queue service for playback synchronization.

FIG. 5 is a diagrammatic depiction of a stateless queue according to the present invention showing a virtual room in which the stateless queue is positioned with an upper immutable portion and a lower mutable portion depicting prioritized content addition to the lower mutable portion of the stateless queue.

DETAILED DESCRIPTION OF THE PREFERRED EMBODIMENT AND METHODS

Figure 1:
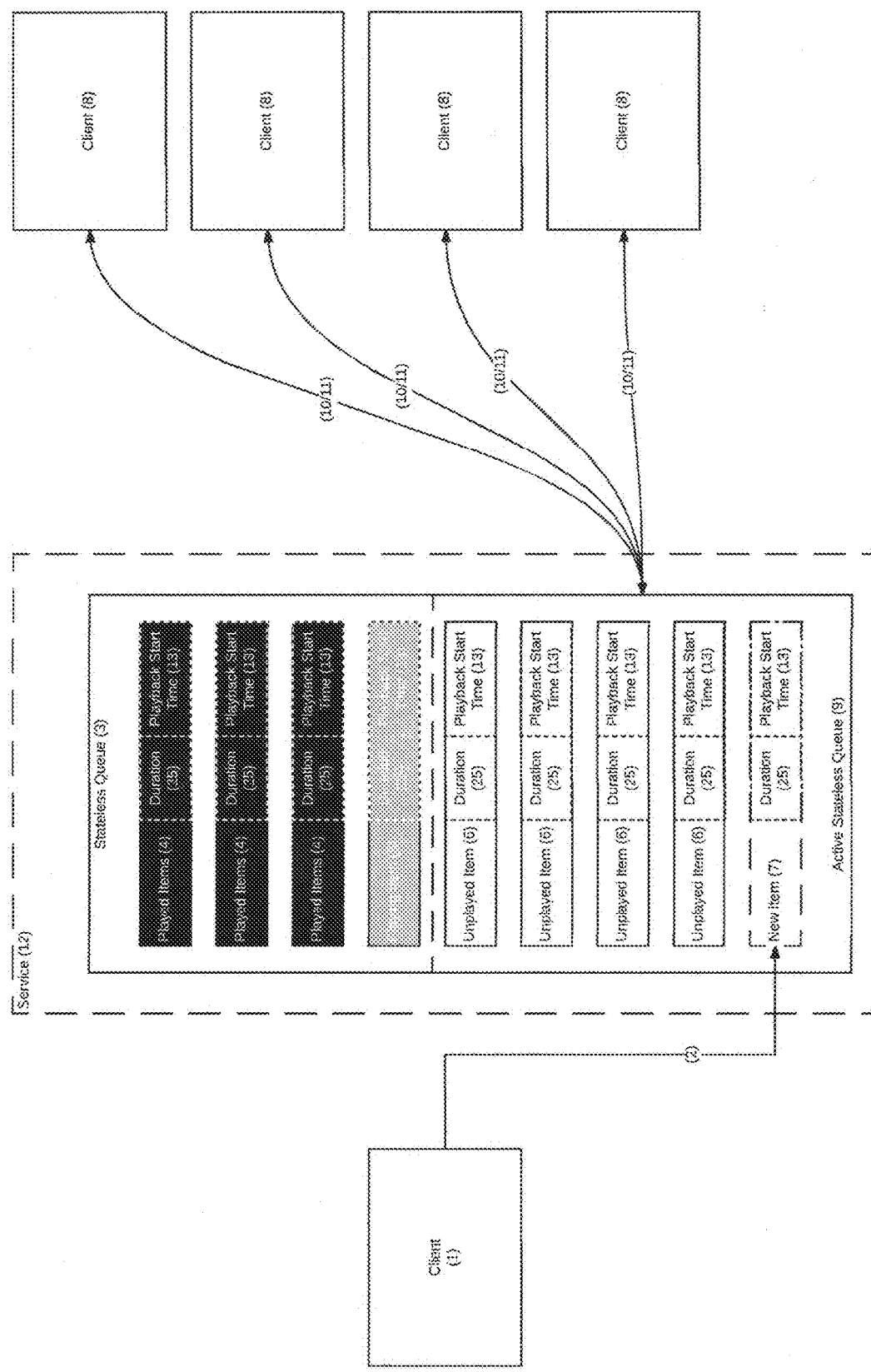
FIG. 1 is a diagrammatic depiction of a stateless queue according to the present invention showing a virtual room in which the stateless queue is positioned with an upper immutable portion and a lower mutable portion with clients able to add content to the lower mutable portion.

Referring now to the drawings with more specificity, the stateless queue system according to the present invention is designed to implement and support a virtual room containing a content or media playback queue exemplified by a music queue as at 3. The stateless queue system according to the present invention is built upon a non-transitory computer-implementable application implemented by one or more application-implementing computers typically in the form of mobile device clients all in communication with a centralized server network. The stateless queue system allows multiple clients, including broadcasting client 1 and broadcast-receiving clients 8 to consume content from the queue 3 in a synchronized manner while further enabling the client(s) 1/8 to modify the content queue 3 without requiring the broadcasting client 1 to send playback events.

The computer-implementable stateless queue application service according to the present invention enables or provides a queue creation service as at 12 for creating a content queue 3 and for storing queue structure and support data in a database. The plurality of application-implementing computer clients as at 1 and 8 are independently operable to selectively add content to the content queue 3 by a select content addition mechanism. The select content addition mechanism is preferably selected from the group consisting of simple end-based or bottom-based content addition, vote-based content addition, and direct modification-based content addition.

The stateless queue system according to the present invention may thus be said to comprise computing clients 1/8 all of which implement the computer-implementable application service 12 for adding content items 2 (e.g. music tracks) to the content queue 3 by interacting with the application service 12 that stores all content queue structure and data in a database. The client(s) 1/8 may update as at 11 the content queue 3 by vote as at 21, or by direct modification 22 of the queue structure.

The client(s) 1/8 may further rely on the application service 12 to provide as at 10 the current order of the content queue 3. The provision of content queue order may typically occur on client entrance into the session (e.g. by joining the virtual room) or periodically by way of a timer (e.g. every "n" seconds). The data provided to the client(s) 1/8 during content queue order provision embraces (a) the queue order at the time of the request, (b) the number of votes each item 2 contains or is affiliated with (if queue structure is determined by vote), (c) the start time for each queued item 2, and the then currently playing item 2.

When a client 1 adds an item 2 to the content queue 3, the newly added item 7 is by default or most simply added to the bottom of the content queue 3 as generally depicted in FIGS. 1 and 5. This content addition may thus be referred to as an end-based or bottom based content addition. The bottom-based content addition mechanism of the application service 12 of assigns a playback start time as at 13 to newly added item(s) 7. The playback start time 13 of any given newly added item 7 is effectively equal to the sum of the playback start time 13 of the preceding item or item precedent and its duration as at 25.

Playback synchronization is preferably achieved by way of synchronizing time across clients 1/8 and a centralized server network as prefaced above. This is preferably and more particularly achieved by directing the application service 12 and clients 1/8 to independently synchronize as at 23 with a Network Time Protocol or NTP server 24 as generally depicted and referenced in FIG. 3 or alternatively by directing the application service 12 to synchronize 23 with an NTP server 24 with client(s) 1/8 indirectly synchronizing through the service 12 as generally depicted in FIG. 4.

FIG. 3 thus depicts a server-direct time synchronization mechanism according to the present invention whereby the client(s) 1/8 directly link to the NTP server 24, and FIG. 4 depicts a server-indirect time synchronization mechanism according to the present invention whereby the client(s) 1/8 link to the NTP server 24 via the application service 12. The latter mechanism ensures time consistency given load balancing or clustered conditions. The client(s) 1/8 preferably synchronize as at 26 with server time via the application service 12 by obtaining NTP server 24 time and adjusting it by a portion (e.g. half) of the time it took for the request to be fulfilled from the NTP server 24.

In both alternative time synchronization scenarios, the time across the application service(s) 12 and the client(s) 1/8 are preferably synchronized to within a single second. Once time is synchronized, playback is preferably synchronized for the purpose of providing a current playback position 16. The current playback position 16 is preferably calculated by subtracting item playback start time 13 from the synchronized time 14 ultimately provided or controlled by the NTP server 24. This process 15 indicates or governs the playback position 16 from which the content playback should initiate or to which the content playback should be synchronized in the case of de-synchronization.

Reprioritization 20 of the content queue 3 or items therewithin may be preferably performed in one of two ways. The content queue 3 preferably comprises two portions, including an immutable portion as at 27 consisting of both already consumed or played items 4 as well as the then playing item 5. The immutable portion 27 is preferably and periodically cleaned or wiped on a time interval, and data from the immutable portion 27 is preferably stored for generating group-curated queues 3. The mutable portion 28 of the content queue 3 is preferably reprioritized/updated by either a voting mechanism 21 or by a direct input or modification mechanism 22 as discussed in more detail hereinafter.

Referencing FIG. 5, the reader will there consider that when the voting mechanism is implemented as at process 21, the queue order is determined by votes in descending order of vote strength. The queue order is preferably calculated either on a timer or every time a client 1/8 submits a new vote. When queue order is directly modified as at process 22 each client 1/8 is enabled to controllably submit the position of an item or manually re-position an item within the content queue 3.

In either re-prioritization 20 scenario as at voting process 21 or direct modification process 22, all items in the affected range 19 require a recalculated playback start time 13. Referencing item 29 in FIG. 5, the reader will there consider item 29 immediately follows a moved item moving from an old position 17 depicted in broken lining to a new position 18 depicted in solid lining. Item 29 thereby inherits the start time of the moved item at the old position 17.

All other depending items recalculate their respective start times from item 29 and its newly inherited start time. This is done by adding the duration of each respective item to the start time of the item that precedes it or the precedent item. For example, referencing FIG. 5, the start time of the next item 29 effectively becomes the start time of the moved item at the old position 17. The start time of the successive item to item 29 will depend from the duration 25 of item 29 plus the start time 13 of item 29. The start time of the moved item at the new position 18 is the start time 13 of item 30 plus the duration 25 of the item 30.

While the above descriptions contain much specificity, this specificity should not be construed as limitations on the scope of the invention, but rather as an exemplification of the invention. For example, it is contemplated that the present invention preferably and essentially comprises a stateless queue system for allowing multiple clients to consume synchronized queued content. The stateless queue system according to the present invention is believed to essentially comprise a non-transitory, computer-implementable application or service 12 for supporting the system or for implementing the stateless queue system according to stateless queue system rules and protocol generally described hereinabove.

A plurality of application-implementing computer clients as at 1 and 8 implement the non-transitory, computer-implementable application, which when implemented, provides a queue creation service for creating a content queue 3 and storing queue structure and support data in a separate database. The plurality or multiplicity of application-implementing computer clients 1/8 are independently operable to selectively add content items to the content queue 3 by a select content addition mechanism as selected from the group consisting of bottom-based content addition generally depicted in FIG. 1 or re-prioritized queue modification as at vote-based content addition as at process 21 and direct modification-based content addition as at process 22 in FIG. 5.

When content is added to the content queue 3 via the bottom-based content addition mechanism, newly added content item 7 is preferably appended to a queue bottom and assigned a playback start time 13. The playback start time 13 of the newly added content item 7 is preferably based on both playback start time(s) 13 of content item(s) precedent 6 and duration(s) 25 of the content item(s) precedent 6. The stateless queue system according to the present invention may preferably comprise a Network Time Protocol (NTP) server 24 in communication with the plurality of computer clients 1/8 such that content queue 3 is played back to the plurality of computer clients 1/8 in a select synchronization manner governed via the NTP server 24.

The select synchronization manner is preferably selected from the group consisting of a server-direct synchronization as generally depicted in FIG. 3 or a server-indirect synchronization as generally depicted in FIG. 4. The server-direct synchronization manner is characterized by independent client-to-server and service-to-server linkages 23 such that the clients 1/8 and application service 12 are independently time-synchronized. The server-indirect synchronization manner is characterized by a service-to-server linkage 23 and a clients-to-service linkage as at 26. In either case, the computer clients 1/8 preferably synchronize with server time by obtaining server time and adjusting server time by a portion (e.g. half) of the fulfillment time. Playback is preferably synchronized by determining the current playback queue position, the current playback queue position being determined or calculated by subtracting the item playback start time 13 from a server-synchronized time 14 as generally depicted in FIG. 2.

The content queue 3 preferably comprises an immutable portion as at 27 and a mutable portion as at 28. The immutable portion preferably comprises previously consumed or played content items as at 4, and a currently playing or consuming content item as at 5. The mutable portion 28 is amenable via the select content addition mechanism as previously described. IN the case or re-prioritization 20 of queue order, the queue order may be determined via either vote-based content addition as at 21 or by direct input or modification content addition as at 22.

The vote-based content addition process 21 operates to modify queue order by vote number in descending order of strength, and may be calculated either periodically via timer or iteratively when a new vote is submitted. When the queue order is determined via direct modification-based content addition 22, the requesting client 1/8 determines queue order directly in by client re-order or placement of content items with in the queue as for example moving a content item from the old position at 17 to the new position at 18.

The mutable portion 28 is preferably governed by a playback recalculation protocol in the event of either content addition. The playback recalculation protocol is characterized by movement of a select content item to a new queue position as at 18. The select content item naturally has a successive content item, which successive content item inherits the original start time of the select content item. All other depending content items recalculate their respective start times based upon the successive content item and the inherited start time thereof. Further, all other content items recalculate respective start times from the successive content item and the inherited start time by adding duration of each respective content item to a start time of a content item precedent.

Recalling that the presently described stateless queue system builds upon the concepts set forth in the '480 application, it is contemplated that the present invention may be further said to provide a method for implementing a social media platform comprising a series of steps. A server may receive from at least one content sharing client an Application Programming Interface (API) first request for initializing a live stream from the content sharing client. The API first request is preferably generated by a non-transitory, computer-implementable application running on the content sharing client. The server may store metadata information of the received API first request in a database coupled to the server.

The server sends a stream configuration second request to an encoding service provider requesting a plurality of stream configurations whereafter the server receives stream configuration information from the encoding service provider and stores the received stream configuration information in the database. The server may then send the stream configuration information to the content sharing client, receiving a first notification from the content sharing client that the content sharing client has initiated a live stream. The server may then send a second notification to the database that the content sharing client has initiated the live stream.

The methodologies practiced or taught by the '480 may thus provide support for a stateless queue system implementation according to stateless queue system rules and protocol of the non-transitory computer-implementable application. The application provides or enables a queue creation service 12 for (a) creating a content queue 3 and (b) storing (i) queue structure and (ii) support data in the database. Each content sharing client 1/8 is independently operable to selectively add content to the content queue 3 by a select content addition mechanism, which select content addition mechanism is selected from the group consisting of bottom-based content addition, vote-based content addition, and direct modification-based content addition as previously described.

Recalling that the presently described stateless queue system builds upon the concepts set forth in the '977 application, it is contemplated that the present invention may be further said to provide a method for implementing social broadcasting within a social media platform comprising a series of steps. A stateless queue service 12 provides a content queue 3 for synchronized and queued content delivery to content sharing clients 1/8 in communication with and implementing the application service 12.

A group origination content sharing client as at 1 sends to a server an API first request for sharing select content with group member content sharing clients as at 8 in communication with the group origination content sharing client 1 via the server and the application service 12. The API first request is generated by an application running on the group origination content sharing client 1. The virtual room holding the stateless queue of the stateless queue system is created on user sign up. Invitations can be sent out on demand by users who enter the virtual room or automatically triggered when a select person enters the virtual room. The room exists even when there are no participants in the virtual room. Thus the system is stateless and no consumption is required to maintain the session. The playback position changes with time and votes or direct user modification. If there are no voting changes, then time is the only modifying factor.

Each group member content sharing client 1/8 may be prompted with information associated with the select content. In this regard, it should be noted that the server can prompt clients or the clients can poll on a timer-based mechanism. This step contemplates either scenario. Each group member content sharing client 1/8 may query a user-preferred source for the select content associated with the information; and the select content may be sourced to each group member content sharing client 1/8 from the user-preferred source selected from one or more content sources in communication with each group member content sharing client. Each content source is characterized by a separate legal access point as described in more detail in the '977 application. Each group member content sharing client 1/8 is preferably independently operable to selectively add content to the content queue 3 by a select content addition mechanism as previously described.

A content broadcast system according to the present invention may further provide for an optimally sourced broadcast to a social consumer group. The content broadcast system may be said to comprise a non-transitory, computer-implementable application for routing select, consumable, legally-protected, and queue-able content to individual members of the social consumer group from an optimal legal access point associated with each individual member and as determined from at least two legal access points. The at least two legal access points consist of a user's own legal access point and at least one third party legal access point.

The queue-able content is queue-able via a queue creation service of the non-transitory, computer-implementable application. A content queue, its structure, and support data may be stored in a separate database. Independent clients of the social consumer group are independently operable to selectively add content to the content queue by a select mechanism, the select mechanism being selected from the group consisting of bottom-based content addition, vote-based content addition, and direct modification-based content addition.

A group streaming system enables individual members of a user group to queue and stream synchronized content in a social environment. The group streaming system according to the present invention may be said to comprise a non-transitory, computer-implementable application for implementing a stateless queue system and a plurality of application-implementing computer clients for implementing the non-transitory, computer-implementable application.

The computer-implementable application provides a queue creation service for (a) creating a content queue and (b) storing queue structure and support data in a separate database. The plurality of application-implementing computer clients are (c) independently operable to selectively add content to the content queue by a select content addition mechanism, and (d) in communication with at least two content sources. The at least two content sources are each characterized by a separate legal access point thus defining at least two legal access points for each computer client.

The computer-implementable application further identifies select content and directs delivery of the select content from a select optimal content resource location for each computer client. Each select optimal content resource location is preferably selected from the at least two content sources. The members of the user group are thereby able to simultaneously access the queued select content for the purpose of providing a content-based platform for social interaction. The group streaming system may further preferably comprise a dialogue platform in the form of chat or live video overlays as described in more detail in the '480 and '977 applications. The dialogue platform enables members of the user group to engage in real-time dialogue regarding at least the select content.

Accordingly, although the inventive system and method have been described by reference to a number of varying exemplary systems and methodologies, it is not intended that the computer-implemented systems and methods be limited thereby, but that modifications thereof are intended to be included as falling within the broad scope and spirit of the materials incorporated by reference, the foregoing disclosures, the following claims, and the drawings, both diagrammatic and illustrative, submitted in support of these specifications.

What is claimed is:

1. A stateless queue system for allowing at least one client to consume synchronized and queued content, the stateless queue system comprising:
   a non-transitory, computer-readable medium storing a computer-implementable application for implementing the stateless queue system; and
   at least one application-implementing computer client for implementing the non-transitory, computer-implementable application;
   the computer-implementable application providing a queue creation service for creating a content queue and storing queue structure and support data in a database, the at least one application-implementing computer client being independently operable to selectively add content to the content queue by a select content addition mechanism, the select content addition mechanism being selected from the group consisting of bottom-based content addition, vote-based content addition, and direct modification-based content addition.

2. The stateless queue system of claim 1 wherein content added via bottom-based content addition is appended to a queue bottom and assigned a playback start time, the playback start time being based on a playback start time and duration of a precedent content item.

3. The stateless queue system of claim 1 comprising a Network Time Protocol (NTP) server in communication with a plurality of computer clients and wherein the content queue is played back to the plurality of computer clients in a select synchronization manner governed via the NTP server.

4. The stateless queue system of claim 3 wherein the select synchronization manner is selected from a group consisting of a server-direct synchronization mechanism or a server-indirect synchronization mechanism.

5. The stateless queue system of claim 4 wherein the server-direct synchronization mechanism is characterized by independent client-to-server and service-to-server linkages.

6. The stateless queue system of claim 4 wherein the server-indirect synchronization mechanism is characterized by a service-to-server linkage and a client-to-service linkage.

7. The stateless queue system of claim 6 wherein the plurality of computer clients synchronize with server time by obtaining server time and adjusting server time by a portion of fulfillment time.

8. The stateless queue system of claim 4 wherein playback is synchronized by calculating the current playback queue position, the current playback queue position being calculated by subtracting item playback start time from a synchronized time.

9. The stateless queue system of claim 1 wherein the content queue comprises an immutable portion and a mutable portion, the immutable portion comprising played and playing content items, the mutable portion being amenable via the select content addition mechanism.

10. The stateless queue system of claim 9 wherein queue order is determined via vote-based content addition by vote number in descending order, the queue order being calculated either periodically via timer or iteratively when a new vote is submitted.

11. The stateless queue system of claim 9 wherein queue order is determined via direct modification-based content addition by manual client prioritization of content items.

12. The stateless queue system of claim 9 wherein the mutable portion is governed by a playback recalculation protocol in the event of content addition, the playback recalculation protocol being characterized by movement of a select content item to a new queue position, the select content item having a successive content item, the successive content item inheriting the start time of the select content item, all other content items recalculating respective start times from the successive content item and an inherited start time thereof.

13. The stateless queue system of claim 12 wherein all other content items recalculate respective start times from the successive content item and the inherited start time by adding duration of each respective content item to a precedent content item start time.

14. A stateless queue system for allowing multiple clients to consume synchronized and queued content, the stateless queue system comprising:
　a non-transitory, computer-readable medium storing a computer-implementable application for implementing the stateless queue system; and
　a series of application-implementing computer clients for implementing the non-transitory, computer-implementable application;
　the computer-implementable application providing a queue creation service for creating a content queue and storing queue structure and support data in a database, the series of application-implementing computer clients being independently operable to selectively add content to the content queue by a select content addition mechanism, the select content addition mechanism being selected from the group consisting of bottom-based content addition, vote-based content addition, and direct modification-based content addition.

15. The stateless queue system of claim 14 wherein content added via bottom-based content addition is appended to a queue bottom and assigned a playback start time, the playback start time being based on a playback start time and duration of a precedent content item.

16. The stateless queue system of claim 14 comprising a Network Time Protocol (NTP) server in communication with a plurality of computer clients and wherein the content queue is played back to the plurality of computer clients in a select synchronization manner governed via the NTP server;
　the select synchronization manner being selected from a group consisting of a server-direct synchronization mechanism or a server-indirect synchronization mechanism;
　the server-direct synchronization mechanism being characterized by independent client-to-server and service-to-server linkages;
　the server-indirect synchronization mechanism being characterized by a service-to-server linkage and a client-to-service linkage.

17. The stateless queue system of claim 14 wherein the content queue comprises an immutable portion and a mutable portion, the immutable portion comprising played and playing content items, the mutable portion being amenable via the select content addition mechanism.

18. The stateless queue system of claim 17 wherein queue order is determined via vote-based content addition by vote number in descending order, the queue order being calculated either periodically via timer or iteratively when a new vote is submitted.

19. The stateless queue system of claim 17 wherein queue order is determined via direct modification-based content addition by manual client prioritization of content items.

20. The stateless queue system of claim 17 wherein the mutable portion is governed by a playback recalculation protocol in the event of content addition, the playback recalculation protocol being characterized by movement of a select content item to a new queue position, the select content item having a successive content item, the successive content item inheriting the start time of the select content item, all other content items recalculating respective start times from the successive content item and an inherited start time thereof.

* * * * *